United States Patent
Bal et al.

(10) Patent No.: US 11,657,078 B2
(45) Date of Patent: May 23, 2023

(54) AUTOMATIC IDENTIFICATION OF DOCUMENT SECTIONS TO GENERATE A SEARCHABLE DATA STRUCTURE

(71) Applicant: FMR LLC, Boston, MA (US)

(72) Inventors: Ananya Bal, Pittsburgh, PA (US); Punitha Chandrasekar, Bengaluru (IN); Vinay Iyengar, Westwood, MA (US); Bidhan Roy, Bengaluru (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/501,397

(22) Filed: Oct. 14, 2021

(65) Prior Publication Data
US 2023/0119590 A1    Apr. 20, 2023

(51) Int. Cl.
| | | |
|---|---|---|
| G06F 16/30 | (2019.01) | |
| G06F 16/383 | (2019.01) | |
| G06V 30/414 | (2022.01) | |
| G06V 30/418 | (2022.01) | |
| G06F 16/31 | (2019.01) | |

(52) U.S. Cl.
CPC .......... *G06F 16/383* (2019.01); *G06F 16/316* (2019.01); *G06F 16/322* (2019.01); *G06V 30/414* (2022.01); *G06V 30/418* (2022.01)

(58) Field of Classification Search
CPC .... G06F 16/383; G06F 16/322; G06F 16/316; G06V 30/418; G06V 30/414
See application file for complete search history.

(56) References Cited

U.S. PATENT DOCUMENTS

| | | | |
|---|---|---|---|
| 6,801,673 B2 | 10/2004 | Chao et al. | |
| 7,603,367 B1 * | 10/2009 | Kanter | G06F 16/00 707/999.005 |
| 8,209,600 B1 | 6/2012 | Koh et al. | |
| 9,418,315 B1 | 8/2016 | Keogh et al. | |
| 10,303,938 B2 | 5/2019 | Chen | |
| 10,565,444 B2 | 2/2020 | Agarwalla et al. | |
| 10,579,707 B2 | 3/2020 | Prebble | |
| 10,803,233 B2 | 10/2020 | Dejean et al. | |
| 11,321,517 B1 * | 5/2022 | Pande | G06F 40/131 |

(Continued)

*Primary Examiner* — Mahesh H Dwivedi
(74) *Attorney, Agent, or Firm* — Cesari & McKenna, LLP

(57) ABSTRACT

Methods and apparatuses are described for automatically identifying text sections of a document to generate a searchable hierarchical data structure. A computing device receives a document comprising text entities and converts the document from a first format to a second format, including generating metadata associated with text alignment, text position, text spacing, or fonts. The computing device extracts the text blocks, including determining coordinates associated with each text block using the metadata. The computing device determines document sections using the document metadata by identifying strings in the extracted text blocks that indicate a presence of a bullet point in the document, assigns a hierarchical category to each identified document section, and inserts text of each document section into a hierarchical data structure based upon the assigned hierarchical category. The computing device traverses the hierarchical data structure using search request data to identify document sections relating to the search request data.

34 Claims, 6 Drawing Sheets

(56) References Cited

U.S. PATENT DOCUMENTS

| | | | |
|---|---|---|---|
| 2011/0082868 A1* | 4/2011 | Musuluri | G06F 16/9535 |
| | | | 715/764 |
| 2012/0102388 A1 | 4/2012 | Fan | |
| 2014/0149401 A1* | 5/2014 | Liu | G06F 16/319 |
| | | | 707/723 |
| 2014/0324416 A1* | 10/2014 | Lapshin | G06F 40/253 |
| | | | 704/9 |
| 2019/0354509 A1* | 11/2019 | Ralhan | G06N 7/01 |
| 2021/0081602 A1 | 3/2021 | Begun et al. | |
| 2021/0216595 A1* | 7/2021 | Walia | G06F 40/131 |
| 2022/0027400 A1* | 1/2022 | Ralhan | G06F 16/355 |
| 2022/0027612 A1* | 1/2022 | Lavery | G06F 40/103 |
| 2022/0374405 A1* | 11/2022 | Morrill | G06F 16/9027 |

* cited by examiner

Project Name:
Contract Number: [Contract Number]

TERMS OF PAYMENT

TP1. AMOUNT PAYABLE – GENERAL

1.1. Subject to any other provisions of the Contract, the Owner shall pay the Contractor, at the times and in the manner hereinafter set out, the amount by which:

1.1.1. the aggregate of the amounts described in TP2 exceeds 1.1.2. the aggregate of the amounts described in TP3; and the Contractor shall accept that amount as payment in full satisfaction for everything furnished and done by him in respect of the Work to which the payment relates.

TP2. AMOUNT PAYABLE TO THE CONTRACTOR

2.1. The amounts referred to in TP1.1.1 are the aggregate of:

2.1.1. the amounts referred to in the Articles of Agreement, and 2.1.2. the amounts, if any, that are payable to the Contractor pursuant to the General Conditions.

TP3. AMOUNTS PAYABLE TO THE OWNER

3.1 The amounts referred to in TP1.1.2 are the aggregate of the amounts, if any, that the Contractor is liable to pay the Owner pursuant to the Contract.

3.2 When making any payment to the Contractor, the failure of the Owner to deduct an amount referred to in TP3.1, from an amount referred to in TP2 shall not constitute a waiver of the right to do so, or an admission of lack of entitlement to do so in any subsequent payment to the Contractor.

TP4. TIME OF PAYMENT

4.1 For the purposes of these Terms of Payment, "payment period" means a period of 30 consecutive days or such other interval as is agreed between the Contractor and the Owner.

4.2 The Contractor shall, on the expiration of a payment period, deliver to the Owner in respect of that payment period a written progress claim that fully describes any part of the work that has been completed, and any material that was delivered to the work site but not incorporated into the work, during that payment period.

4.3 The Owner shall, not later than ten days after receipt by him of a progress claim referred to in TP4.2:

4.3.1. inspect the part of the work and the material described in the progress claim, and 4.3.2. issue a progress report, which may take the form of an endorsement on the progress claim, a copy of which will be given to the Contractor, that indicates the value of the part of the Work and the material described in the progress claim that, in his opinion:

4.3.2.1. is in accordance with the Contract; and 4.3.2.2. was not included in any other progress report relating to the Contract.

Government of the Northwest Territories
Construction Contract

| Section Text | Start Page | Start Row | Start-(y) | Left1 | End Page | End Row | End-(y) | Left2 | Page Length | Page Height |
|---|---|---|---|---|---|---|---|---|---|---|
| TP1 Amount... | 20 | 31 | 336 | 84 | 20 | 37 | 398 | 84 | 612 | 792 |
| 1.1 Subject... | 20 | 58 | 627 | 48 | 22 | 14 | 163 | 48 | 612 | 792 |
| 1.1.1 the... | 22 | 16 | 184 | 84 | 22 | 16 | 290 | 48 | 612 | 792 |
| 1.1.2 the... | 22 | 18 | 184 | 84 | 22 | 18 | 290 | 48 | 612 | 792 |
| ... | ... | ... | ... | ... | ... | ... | ... | ... | ... | ... |

//  AUTOMATIC IDENTIFICATION OF DOCUMENT SECTIONS TO GENERATE A SEARCHABLE DATA STRUCTURE

TECHNICAL FIELD

This application relates generally to methods and apparatuses, including computer program products, for automatically identifying text sections of a document to generate a searchable hierarchical data structure corresponding to the document.

BACKGROUND

Many large organizations—such as financial services companies, government and regulatory agencies, corporations, and the like—are required to ingest, analyze and compare long, complex, multi-sectioned digital documents such as agreements, policies, regulations, and legislation. It is critically important that document sections are identified as precisely as possible, including relevant subsections and corresponding text. Often though, such digital documents lack sufficient metadata to help identify the exact boundaries of sections and to also connect sections with relevant subsections.

As a result, processing of such digital documents relies upon either manual review of the documents (which can take many hours and is prone to errors) or basic computerized analysis of the documents (which is not dynamic enough to account for the diversity of hierarchical structures, modalities, and language across documents from different sources). One such approach is the "sliding window" approach, where the computer system attempts to analyze a document using pre-defined knowledge of a document template and/or analyzing a fixed number of lines at a time. However, when variances to the template arise in documents, the sliding window approach does not produce desired results. This approach also requires domain-specific knowledge and cannot be readily adapted to different document templates and/or changes to existing templates.

Other, newer computer techniques such as computer vision and deep learning have been employed to tackle the above-mentioned problem. Typically, in these techniques, boundaries of text in documents are estimated through complicated, processor-intensive computations (e.g., neural networks) performed on a training set of documents. While more dynamic and intuitive than the manual or sliding window approaches described previously, such advanced machine learning techniques have been shown effective only for shorter and simpler documents (e.g., receipts, newspapers, research papers, etc.) where blocks of text have uniform boundaries and are well-arranged. Also, machine learning typically requires a large volume of annotated training data which can be prohibitive to collect and prepare.

SUMMARY

Therefore, what is needed are computerized methods and systems that enable generation of hierarchical data structures corresponding to complex digital documents that can be easily stored and searched to find relevant sections and subsections. The techniques described herein advantageously provide for identification of document sections with precise boundaries based upon positional metadata for bullet point strings in the document. Once such document sections are identified, the methods and systems beneficially generate a hierarchical data structure automatically using the positional metadata and classification of sections so that relationships between sections and corresponding subsections are maintained, making it easier and faster to search such data structures for relevant information. In addition, the methods and systems described herein provide for a reduction in data processing and computation time over similar existing systems that utilize machine learning and other complex, time-intensive techniques.

Furthermore, the systems and methods of the present disclosure are able to counter discrepancies in positional metadata (e.g., even where a second child paragraph (subsection two) is slightly more indented than a first child paragraph (subsection one) but not indented enough to fall under the next level in the hierarchy, the present systems and methods utilize 'fuzzification' techniques to group both subsections one and two in the same level of the hierarchy—i.e., the level of subsection one). Finally, the techniques provided herein efficiently extract a section of the document from any level of the hierarchy in order to perform easy and quick analysis of sections of interest.

The invention, in one aspect, features a computer system for automatically identifying text sections of a document to generate a searchable hierarchical data structure corresponding to the document. The system comprises a computing device having a memory for storing computer-executable instructions and a processor that executes the computer-executable instructions. The computing device receives a document comprising a plurality of text entities. The computing device converts the document from a first format to a second format, including generating metadata associated with one or more of text alignment in the document, text position in the document, text spacing in the document, and fonts in the document. The computing device extracts a plurality of text blocks from the converted document, including determining coordinates associated with each text entity using the document metadata. The computing device identifies one or more document sections from the extracted text blocks using the document metadata by identifying strings in the extracted text blocks that indicate a presence of a bullet point in the document. The computing device assigns a hierarchical category to each identified document section. The computing device inserts text of each document section into a hierarchical data structure based upon the assigned hierarchical category. The computing device traverses the hierarchical data structure using search request data to identify one or more document sections that have text relating to the search request data.

The invention, in another aspect, features a computerized method of automatically identifying text sections of a document to generate a searchable hierarchical data structure corresponding to the document. A computing device receives a document comprising a plurality of text entities. The computing device converts the document from a first format to a second format, including generating metadata associated with one or more of text alignment in the document, text position in the document, text spacing in the document, and fonts in the document. The computing device extracts a plurality of text blocks from the converted document, including determining coordinates associated with each text entity using the document metadata. The computing device identifies one or more document sections from the extracted text blocks using the document metadata by identifying strings in the extracted text blocks that indicate a presence of a bullet point in the document. The computing device assigns a hierarchical category to each identified document section. The computing device inserts text of each document section into a hierarchical data structure based upon the assigned hierarchical category. The computing device traverses the hierarchical data structure using search request data to identify one or more document sections that have text relating to the search request data.

Any of the above aspects can include one or more of the following features. In some embodiments, converting the document from a first format to a second format comprises converting the document from a Portable Document Format (PDF) to a paginated Hypertext Markup Language (HTML) format. In some embodiments, extracting the plurality of text blocks from the converted document comprises: extracting at least one or more attributes from the HTML-converted document; inserting the plurality of text blocks into a dataframe; and ordering the plurality of text blocks in the dataframe according to a page number, a top coordinate value and a left coordinate value. In some embodiments, the computing device removes one or more of the plurality of extracted text blocks that do not correspond to a section of the document. In some embodiments, removing one or more of the plurality of extracted text blocks that do not correspond to a section of the document comprises identifying at least one header block or at least one footer block in the plurality of extracted text blocks and removing the identified header and footer blocks. In some embodiments, identifying at least one header block or at least one footer block in the plurality of extracted text blocks comprises comparing one or more text strings in a predefined window at the top or the bottom of consecutive pages of the document to determine a match, and identifying the matching text strings as a header block or a footer block.

In some embodiments, identifying one or more document sections from the extracted text blocks using the document metadata by identifying strings in the extracted text blocks that indicate a presence of a bullet point in the document comprises: determining a starting boundary of a document section based upon a presence of a bullet point and corresponding text as HTML entities on a same line of the converted document; determining indentation values associated with a start of each extracted text block using the metadata; calculating a number of times that each unique indentation value occurs in the converted document; removing one or more indentation values that falsely indicate a start of an extracted text block; selecting one or more unique indentation values that occur at least a defined number of times in the extracted text blocks as corresponding to a start of a document section; and identifying one or more bullet point strings in the document section using the selected unique indentation values. In some embodiments, the computing device flags each line in the extracted text blocks containing an identified bullet point string that corresponds to a start of a document section.

In some embodiments, assigning a hierarchical category to each identified document section comprises: determining a set of hierarchical categories for the converted document based upon unique indentation values of the document sections identified in the converted document, wherein a lowest indentation value corresponds to a highest hierarchical category; and assigning a hierarchical category from the set of hierarchical categories to each identified document section based upon the indentation value of the identified document section. In some embodiments, assigning a hierarchical category from the set of hierarchical categories to each identified document section based upon the indentation value of the identified document section comprises assigning the identified document section to a hierarchical category when the indentation value for the identified document section falls within a range of indentation values associated with the hierarchical category.

In some embodiments, inserting text of each document section into a hierarchical data structure comprises identifying the text of each document section based upon one or more flagged lines in the extracted text blocks and inserting the text of the document section into the hierarchical data structure based upon the assigned hierarchical category for the section. In some embodiments, inserting the text of the document section into the hierarchical data structure based upon the assigned hierarchical category for the section comprises backtracking through the hierarchical data structure to find an immediate parent for the document section.

In some embodiments, traversing the hierarchical data structure using search request data to identify one or more document sections that contain text relating to the search request data comprises: receiving the search request data from a remote computing device; locating one or more document sections in the hierarchical data structure that contain text matching one or more elements of the search request data; and retrieving the located document sections from the hierarchical data structure. In some embodiments, at least the located document sections are transmitted to the remote computing device for display. In some embodiments, the document comprises one or more sub-sections that have a relationship to a parent section and the hierarchical data structure is arranged based upon the relationship between the one or more sub-sections and the parent section. In some embodiments, retrieving the located document sections from the hierarchical data structure comprises retrieving all sub-sections that are related to the located document sections in the hierarchical data structure. In some embodiments, the computing device ranks the located document sections according to relevance to the search request data using one or more encoders.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a diagram of an exemplary document used with the system.

FIG. 4 is a diagram of a dataframe generated by the system from a converted document.

DETAILED DESCRIPTION

Figure 1:
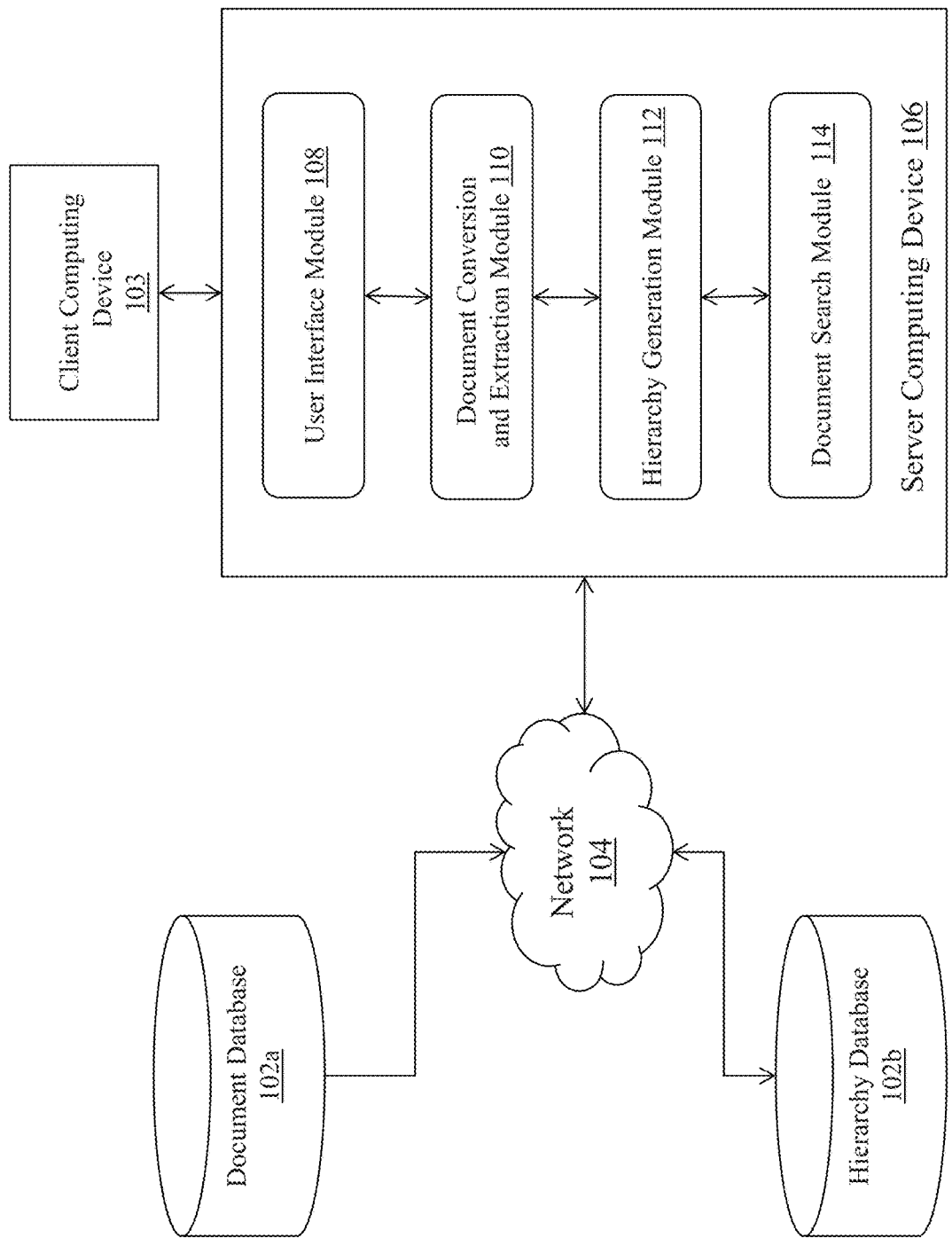
FIG. 1 is a block diagram of a system for automatically identifying text sections of a document to generate a searchable hierarchical data structure corresponding to the document.

FIG. 1 is a block diagram of a system 100 for automatically identifying text sections of a document to generate a searchable hierarchical data structure corresponding to the document. The system 100 includes document database 102a, hierarchy database 102b, client computing device 103, communications network 104, server computing device 106 that includes user interface module 108, document conversion and extraction module 110, hierarchy generation module 112, and document search module 114.

The databases 102a, 102b are located on a single computing device (or in some embodiments, on a plurality of computing devices) coupled to the server computing device 106 and are configured to receive, generate, and store specific segments of data relating to the process of automatically identifying text sections of a document to generate a searchable hierarchical data structure corresponding to the document as described herein. In some embodiments, all or a portion of the databases 102a, 102b can be integrated with the server computing device 106 or be located on a separate computing device or devices. The databases 102a, 102b can be configured to store portions of data used by the other components of the system 100, as will be described in greater detail below. In some embodiments, the databases 102a, 102b are located in a cloud storage infrastructure comprising one or more nodes accessible by server computing device 106.

The document database 102a includes a plurality of digital documents in one or more defined file formats (such as Portable Document Format (PDF) from Adobe®). In some embodiments, the documents in database 102a comprise complex transaction and/or agreement documents that typically include a plurality of text sections and sub-sections arranged in a hierarchical format—often with the use of bullet points to indicate the start of the aforementioned text sections and/or sub-sections. An excerpt from an exemplary document 200 stored in database 102a is shown in FIG. 2. As shown in FIG. 2, the document 200 comprises an adoption agreement for a profit sharing plan, with a plurality of different sections and sub-sections that are indicated by bullet points—such as section 2 with sub-sections a through g.

The client computing device 103 connect to the communications network 104 in order to communicate with the server computing device 106 to provide input and receive output relating to the process for automatically identifying text sections of a document to generate a searchable hierarchical data structure corresponding to the document as described herein. The client computing device 103 can be coupled to a display device (not shown), such as a monitor or screen. For example, client computing device 103 can provide a graphical user interface (GUI) via the display device to a user of the corresponding device that presents output resulting from the methods and systems described herein and receives input from the user for further processing.

Exemplary client computing devices 103 include but are not limited to desktop computers, laptop computers, tablets, mobile devices, smartphones, smart watches, Internet-of-Things (IoT) devices, and Internet appliances. It should be appreciated that other types of computing devices that are capable of connecting to the components of the system 100 can be used without departing from the scope of invention. Although FIG. 1 depicts a single client computing device 103, it should be appreciated that the system 100 can include any number of client computing devices.

The communications network 104 enables the databases 102a, 102b and the server computing device 106 to communicate with each other. In some embodiments, the client computing device 103 is similarly connected to the network 104 in order to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automated analysis of customer interaction text to generate customer intent information and a hierarchy of customer issues as described herein. The server computing device 106 includes several computing modules 108, 110, 112, 114 that execute on the processor of the server computing device 106. In some embodiments, the modules 108, 110, 112, 114 are specialized sets of computer software instructions programmed onto one or more dedicated processors in the server computing device 106 and can include specifically-designated memory locations and/or registers for executing the specialized computer software instructions.

Although the modules 108, 110, 112, 114 are shown in FIG. 1 as executing within the same server computing device 106, in some embodiments the functionality of the modules 108, 110, 112, 114 can be distributed among a plurality of server computing devices. As shown in FIG. 1, the server computing device 106 enables the modules 108, 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112, 114 is described in detail below.

Figure 3:
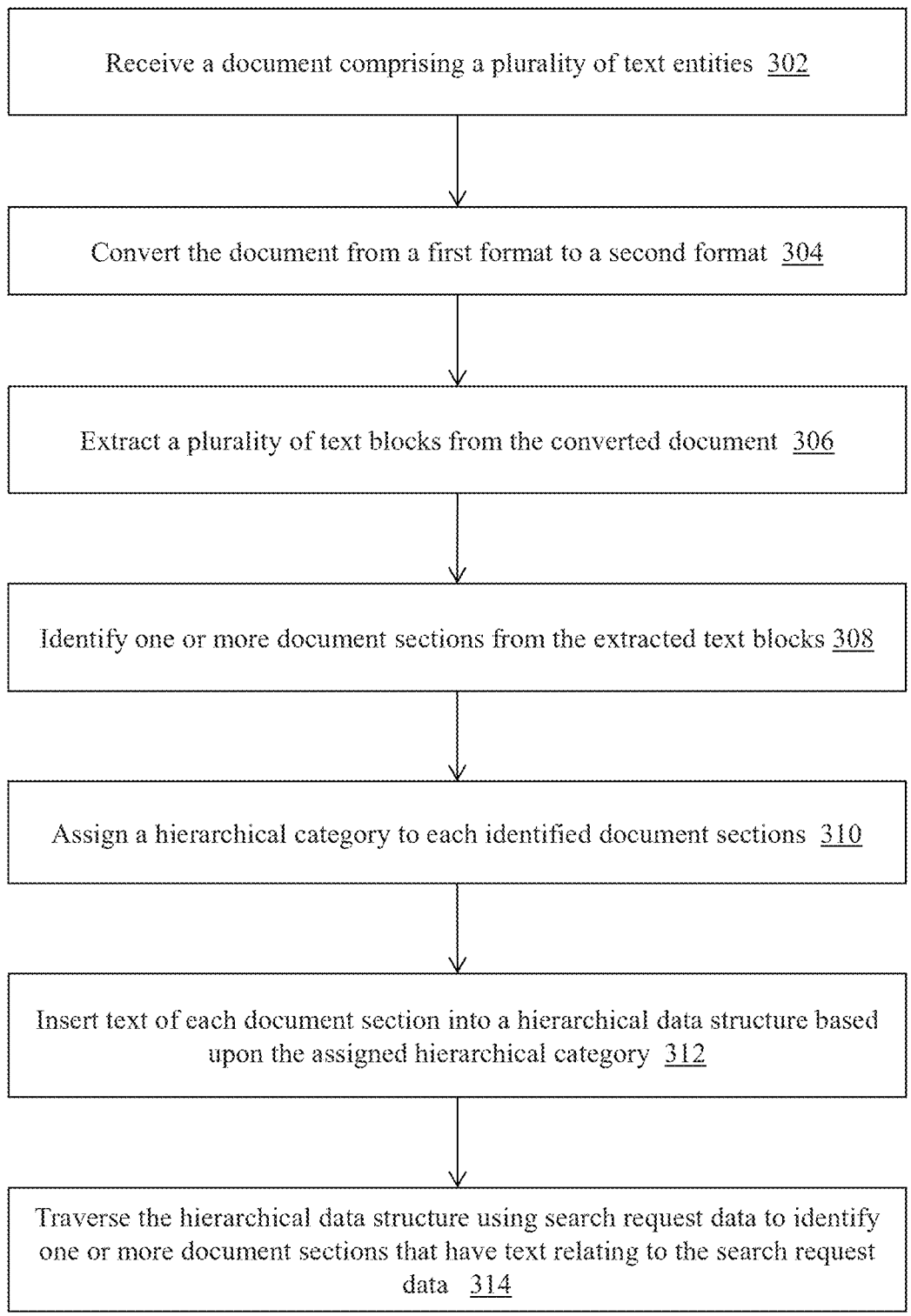
FIG. 3 is a flow diagram of a computerized method of automatically identifying text sections of a document to generate a searchable hierarchical data structure corresponding to the document.

FIG. 3 is a flow diagram of a computerized method 300 of automatically identifying text sections of a document to generate a searchable hierarchical data structure corresponding to the document, using the system 100 of FIG. 1. The document conversion and extraction module 110 receives (step 302) a document from document database 102a (e.g., via network 104), where the document comprises a plurality of text entities. As described above, an example document 200 is shown in FIG. 2 which comprises several different sections and sub-sections each containing a portion of text. The module 110 retrieves the document file from database 102a for conversion and extraction of the text as provided herein. In one example, the module 110 can periodically retrieve documents for processing from database 102a (e.g., via batch job) or in other examples, the module 110 can retrieve and process documents 'on demand'—such as when a user of client computing device 103 enters a search query via user interface module 108, as will be described later in this specification. In some embodiments, the documents are stored as digital files in database 102a according to one of a number of different file formats. Exemplary file formats can be Adobe® Portable Document Format (.pdf), Microsoft® Word® format (.doc), or other types of document formats. As can be appreciated, certain image-based files (e.g., scanned documents that comprise .tiff, .gif, .jpg images) can be first converted into another format (such as .pdf) before storage in the database 102a.

The document conversion and extraction module 110 converts (step 302) the document received from database 102a from a first format to a second format. As explained above, the documents are stored in database 102a according to one or more file formats. The module 110 performs processing steps in order to convert the document from the original file format to another file format that can be used by the system 100 to conduct the identification of text sections and generation of the hierarchical data structure as described herein.

In some embodiments, the module 110 converts the document from a .pdf format to a paginated Hypertext Markup Language (.html) format. In one example, the module 110 uses the PyMuPDF Python library available from github.com/pymupdf/PyMuPDF in order to perform this conversion. The output .html document is paginated such that the pages of the .html document correspond to the pagination of the original .pdf file. As part of the conversion, the document conversion and extraction module 110 also obtains and/or generates metadata associated with the document that is used in later steps of the processing. For example, a .pdf file can comprise certain existing metadata elements that are descriptive of the text formatting and the module 110 can extract those metadata elements from the .pdf file. In another example, the module 110 can use the existing metadata elements to generate new types of metadata that are not already contained in the .pdf file. In some embodiments, the module 110 can obtain and/or generate specific types of metadata, including but not limited to: text alignment in the document, text position in the document, text spacing in the document, and fonts in the document. In some embodiments, the module 110 can store the converted document (e.g., .html file) and/or document metadata in, e.g., hierarchy database 102b or in one or more other databases and link the converted document and/or metadata to the original document file as stored in database 102a.

Once the converted document is generated, the document conversion and extraction module 110 extracts (step 306) a plurality of text blocks from the converted document. As part of the extraction process, the module 110 can perform one or more pre-processing steps, such as removing certain elements in the converted document. In the case where the converted document is an .html file, the module 110 removes at least one of HTML tags and/or HTML attributes from the converted document to identify and extract the text blocks of the document itself and determine positions and/or coordinates of the text blocks on the page. Exemplary coordinate data includes (i) the page number where the text block is located, (ii) top (y) value—how far from the top of the page the text block is located, and (iii) left (x) value—how far from the left of the page the text block is located. In some embodiments, the module 110 extracts relevant data from the HTML code, which can involve identifying chunks of text from the document as well as metadata like HTML tags (top, left, etc.). The module 110 can eliminate tags but generally the module 110 is not focused on completely cleaning the HTML code. In one example, the HTML code might be:

"<p style="position: absolute; white-space: pre; margin: 0; padding: 0; top: 34 pt; left: 445 pt"><b><span style="font-family: TimesNewRomanPS, serif; font-size: 9 pt">Nonstandardized 401(k) Plan </span></b></p>"

The module can extract certain portions of the HTML code, as follows:

top: 34;
left: 445;
text="Nonstandardized 401(k) Plan"

Once the module 110 has extracted the text blocks and identified the associated coordinates, the module 110 inserts the plurality of text blocks and coordinate data into a dataframe and arranges the plurality of text blocks in the dataframe according to the page number, the top (y) coordinate value and the left (x) coordinate value. FIG. 4 depicts an example dataframe 400 generated by the document conversion and extraction module 110 from a converted document. As shown in FIG. 4, the dataframe 400 includes a page number, a top (y) value, a left (x) value, and a text string for each text block extracted from the converted document. The rows in the dataframe 400 are stored by page number, then top (y) value, and then by left (x) value. In one example, the top (y) value and left (x) value are stored as pixel (px) values, obtained or generated from the .html document. For example, a text block on one page of the converted .html document can comprise an HTML tag of:

<p style="position: absolute; white-space: pre; margin: 0; padding: 0; top: 55 pt; left: 240 pt"><b><span style="font-family: TimesNewRomanPS, serif; font-size: 9 pt">ADOPTION AGREEMENT #005 </span></b></p>

The module 110 can extract the left and top metadata and use it in the dataframe. Advantageously, by organizing the dataframe according to page number, x, and y, the module 110 ensures that all out-of-line text extractions are placed in the proper position in the hierarchy, specifically with respect to blanks and special characters that may differ from their respective text lines in the document by a few pixels. In these cases, the PyMuPDF library may extract the text blocks at the end of the page instead of where they originally appear on the page. The dataframe provides for remediation of these extraction errors and efficient organization of the extracted text blocks for generating a hierarchical data structure that accurately represents the structure of the underlying document.

After the dataframe is generated, the document conversion and extraction module 110 can perform a processing step whereby the text block(s) corresponding to the page header and/or the page footer for each page of the converted document are removed. As can be appreciated, complex agreements and business documents may include header and/or footer information repeated on each page of the document (e.g., document title, filename, date, page number, etc.). In order to prevent this data from being interpreted as part of the document hierarchy, the module 110 identifies the text blocks for the header and/or footer and removes these text blocks (including the text itself) from all pages of the converted document. In some embodiments, the module 110 identifies headers and footers using a string matching process across three pages of the document. The module 110 checks strings across three pages (i.e., because three is the minimum number of pages to check in order to detect a pattern and checking strings across more than three pages increases the computation and time required). At the start of a document, there may be forms or pages appended to the document which are not actually a part of the document that a user wants to analyze (e.g., these pages may not have the same letterhead/header/footer as pages of the actual document). For this reason, the module 110 captures three pages from the middle of the document (i.e., if there are 32 pages in the document, the module 110 chooses pages 15, 16, and 17). The module 110 checks a window of five lines from the top (for the header) and five lines from the bottom (for the footer) of the first captured page line-by-line for matches across the three pages (i.e., first line to last line for header and last line to first line for footer). If the module 110 finds a line matching across all three pages with the exception of two to three characters (e.g., fuzzification to take account of changing page numbers, incorrect character conversion in HTML, etc.), the line is counted as a header or footer. Once the module 110 obtains the number of lines in the header and footer, these lines are removed from the top and bottom of each page's text in the dataframe. As a result, the header and footer text blocks are not incorporated into the associated hierarchical data structure for the document to avoid disrupting the hierarchy with erroneous or unnecessary text blocks.

Next, the document conversion and extraction module 110 identifies (step 308) one or more document sections from the extracted text blocks using the document metadata, by identifying strings in the extracted text blocks that indicate a presence of a bullet point in the document. As can be appreciated, after a document has been converted to .html, a text block that corresponds to a bullet point can be represented in HTML as two separate entities that have the same metadata. For example, an original document may have the following text on a given line:

a. The Agreement states . . .

When converted to HTML, this text may be represented as:

<metadata xyz top=75 pt; left: 445 pt" />ADOPTION AGREEMENT #005 </metadata>

<metadata xyz top=55 pt; left: 240 pt" />NONSTANDARDIZED 401(k) PLAN </metadata> where 75 pt is the position of the text in relation to one or more other elements on the page (such as the top of the page). When the module 110 detects this type of split or division between text elements that have the same position value (e.g., 'top=75 pt') or line value, the module 110 determines this string as a possible bullet point candidate. The module 110 analyzes each row in the dataframe and determines which rows corresponds to text blocks that may contain bullet points. Of these identified rows, false positives are eliminated by using simple rules like capping word length or checking for special characters that are unlikely in bullet points.

In some embodiments, the module 110 can determine a starting boundary of a document section based upon a presence of a bullet point and corresponding text as HTML entities on a same line of the converted document. As described above, a bullet point and accompanying text can be represented in the .html file as two entities that have the same distance from the top of the page and/or have the same line number. Then, using the metadata, the module 110 determines indentation values associated with a start of each extracted text block. For example, an extracted text block may have an value in its HTML metadata under the 'left' property (e.g., <left=35 pt; . . . />) which indicates the position of the text block from the left edge of the page. The module 110 can capture the 'left' property value as the indentation value for the text block.

The module 110 can then calculate the number of times that each unique indentation value occurs in the converted document (e.g., using the 'left' property value as stored in the dataframe). As can be appreciated, if a particular indentation value appears frequently in the document, it is more likely that the text blocks having that indentation value correspond to the start of document sections. In some embodiments, the module 110 uses a fuzzy threshold approach when calculating the number of times that each unique indentation value occurs. For example, a document may have related sections that use the bullet point values 1), 2), 3), 4), etc. However, due to complexities in document formatting and/or conversion from .pdf to .html, these related sections may have slightly different indentation values—e.g., one section may have an indentation value of 34 pt while another section may have an indentation value of 37 pt, and so forth. Because the slight difference in indentation values should not affect the determination that these sections 'share' a unique indentation value, the document conversion and extraction module 110 can determine that text blocks with an indentation value within a certain range (e.g., within 5 pt of each other) should be counted as having the same unique indentation value. Using the above example, text blocks with indentation values of 34 pt and 37 pt can be calculated as sharing the unique indentation value of 35 pt.

After the above calculation, the module 110 can select one or more unique indentation values that occur at least a defined number of times in the extracted text blocks as corresponding to a start of a document section. In one example, the module 110 determines that the unique indentation value of 35 pt occurs eight times in the converted document. Using a defined threshold of three times, the module 110 selects text blocks with the indentation value of 35 pt as corresponding to a start of a document section. In some embodiments, the document conversion and extraction module 110 filters out any text blocks that have an indentation value that does not correspond to a unique indentation value occurring a certain number of times in the document.

Once the module 110 has determined the filtered list of text blocks that correspond to bullet points, the module 110 identifies one or more bullet point strings in each of these text blocks. For example, the module 110 use the HTML syntax to flag the line in the text block that has the split of HTML elements as described above, e.g.,:

<p style="position: absolute; white-space: pre; margin: 0; padding: 0; top: 241 pt; left: 53 pt"><span style="font-family: TimesNewRomanPSMT, serif; font-size: 9 pt">1. </span></p><p style="position: absolute; white-space: pre; margin: 0; padding: 0; top: 241 pt; left: 72 pt"><span style="font-family: TimesNewRomanPSMT, serif; font-size: 9 pt">EMPLOYER </span> as containing the bullet point string (i.e., '1.' is the bullet point and it is followed by the text "EMPLOYER" which are split into two span tags). The identified bullet point strings/flagged lines can comprise section boundaries in the document.

Continuing with FIG. 3, the hierarchy generation module 112 receives the dataframe and the identified rows with bullet point strings of the document sections, and assigns (step 310) a hierarchical category to each identified document section. In one embodiment, the document section(s) that are associated with the smallest indentation value are assigned to a first category and the document section(s) that are associated with the largest indentation value are assigned to a last category—with document section(s) having indentation values in between the smallest and largest values assigned to categories between the first and last categories. For example, a document may be structured as follows:

1. Section 1
  a. Subsection 1.a
  b. Subsection 1.b
2. Section 2
  a. Subsection 2.a
    i. Subsection 2.a.i 3. Section 3
. . . .

Each of the main sections (1, 2, 3, . . . ) have the same unique indentation value (e.g., 10 px), each of the primary subsections (a, b, . . . ) have the same unique indentation value (e.g., 20 px), the secondary subsection (i) has the indentation value (e.g., 30 px).

Using this example, the module 112 assigns a first hierarchical category to the main sections 1, 2, 3. The module 112 assigns a second hierarchical category to the primary subsections a, b. And, the module 112 assigns a third hierarchical category to the secondary subsection i. In this way, the first category corresponds to the highest level while the third category corresponds to the lowest level. One example might be the categories Level 1, Level 2, and Level 3 for the first, second, and third hierarchical categories, respectively. As can be appreciated, sections assigned Level 2 are considered children of the parent section assigned Level 1, and so forth.

Once the document sections are assigned a category, the hierarchy generation module 112 inserts (step 312) text of each document section into a hierarchical data structure based upon the assigned hierarchical category. In some embodiments, the hierarchical data structure can comprise a Document Object Model (DOM) tree. To create the DOM tree, the module 112 uses the identified bullet point strings/flagged lines from the text block in each document section and uses the assigned category to insert the text blocks into the DOM tree. The module 112 can retrieve the indentation values for each document section (e.g., from the dataframe) and store the indentation values in a queue. For any given document section, the module 112 backpropagates through the queued indentation values to find the last higher category, and then adds the corresponding text block to the DOM tree. It should be appreciated that other types of hierarchical data structures may be used without departing from the scope of invention.

Figure 5:
FIG. 5 is a diagram of an exemplary DOM tree generated by the system.

FIG. 5 is an excerpt from an exemplary DOM tree 500 generated by the hierarchy generation module 112 from the document 200 depicted in FIG. 2. As shown in FIG. 5, the DOM tree 500 comprises a hierarchical structure that corresponds to the structure of the document 200 in FIG. 2, with main sections and corresponding subsections denoted as "children." The hierarchy generation module 112 can store the DOM tree in hierarchy database 102b, to be used in conjunction with the search features described below.

An important aspect of the methods and systems described herein is the ability to search for and retrieve document sections (and any related subsections) quickly and efficiently using the hierarchical data structure. For example, a user at client computing device 103 may want to search for document sections that contain particular provisions across the corpus of digital documents stored in database 102a. However, due to the diversity of document language, structure, and/or organization that may be used between documents from different sources or authors, this task cannot be performed efficiently without leveraging the hierarchical data structure described herein.

Figure 6:
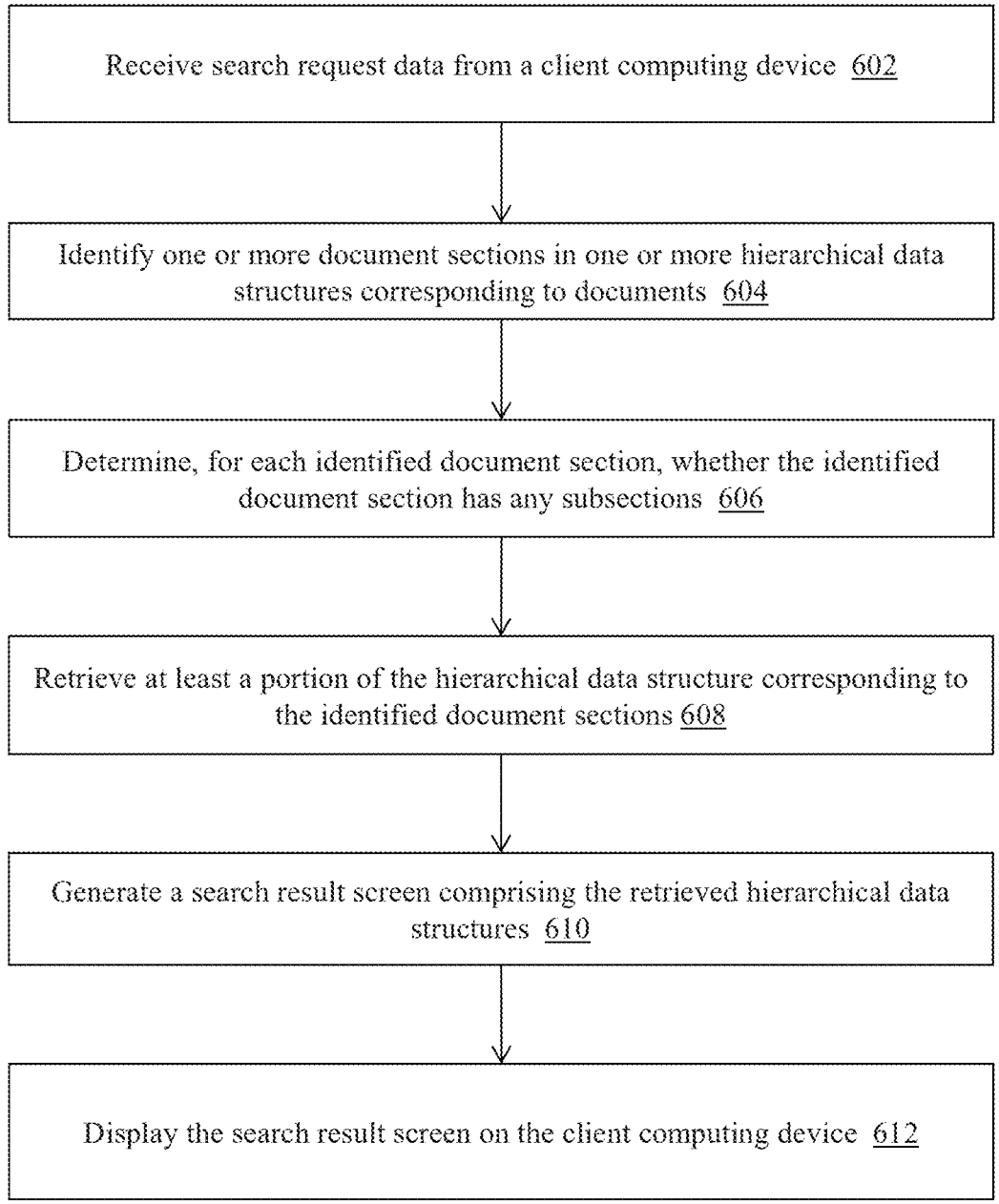
FIG. 6 is a flow diagram of a computerized method of searching documents using the hierarchical data structures generated by the system.

Continuing with FIG. 3, the document search module 114 receives search request data from client computing device 103 and traverses (step 314) one or more of the hierarchical data structures stored in database 102b using the search request data to identify one or more document sections that have text relating to the search request data. FIG. 6 is a flow diagram of a computerized method of searching documents using the hierarchical data structures generated by the system 100 of FIG. 1. A user at client computing device 103 communicates with server computing device 106 in order to search through the corpus of digital documents stored in database 102a. The user interface module 108 of server computing device 106 generates a search interface for display on client computing device 103.

The user enters one or more search terms and/or search parameters into the search interface, which comprises the search request data, and transmits the search request data to the server computing device 106. The document search module 114 receives (step 602) the search request data from client computing device 103 and the module 114 identifies (step 604) one or more document sections in the collection of DOM trees stored in database 102b. For example, the module 114 can generate queries using the search request data and traverse the text blocks stored in the DOM trees to identify sections of documents that match the queries and/or search terms.

Once the relevant document sections are identified, the module 114 determines (step 606), for each identified document section, whether the identified document section (i) has any subsections (i.e., children) or (ii) has no subsections. When the identified document section does have subsections, the module 114 retrieves (step 608) the portion of the DOM tree corresponding to the identified document section and all subsections below the identified section (if there are no subsections, the module 114 just retrieves the portion of the DOM tree for the identified document section).

The document search module 114 transmits the DOM tree(s) retrieved during the search to the user interface module 108, which generates (step 610) a search result screen that comprises at least a portion of each retrieved DOM tree. The user interface module 108 transmits the search result screen to the client computing device for display (step 612). For example, the user interface module 108 can provide a list of search results showing, e.g., the relevant section(s) and/or subsection(s) that contain the search terms. In some embodiments, the search result screen can also include a link to the corresponding original document for each search result—so that the user can quickly access the underlying document and view the provisions of interest.

In some embodiments, the document search module 114 can further rank the document sections retrieved during the search according to, e.g., relevance to the search query and provide a sorted list of search results to the user of client computing device 103. In some embodiments, the document search module 114 can use one or more encoders to rank the document sections. An exemplary encoder used for ranking is a Tiny BERT encoder (as described in X. Jiao et al., "TinyBERT: Distilling BERT for Natural Language Understanding," arXiv:1909.10351, available at arxiv.org/pdf/1909.10351, Oct. 16, 2020, incorporated herein by reference). The encoder receives as input a piece of text and a question for which it tries to locate the answer in the text. If the answer is present, the encoder confers a high relevance score upon the piece of text, otherwise the encoder confers a lower score upon the piece of text.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for automatically identifying text sections of a document to generate a searchable hierarchical data structure corresponding to the document, the system comprising a computing device having a memory for storing computer-executable instructions and a processor that executes the computer-executable instructions to:
   receive a document comprising a plurality of text entities;
   convert the document from a first format to a second format, including generating metadata associated with one or more of text alignment in the document, text position in the document, text spacing in the document, and fonts in the document;
   extract a plurality of text blocks from the converted document, including determining coordinates associated with each text entity using the document metadata;
   identify one or more document sections from the extracted text blocks using the document metadata by identifying strings in the extracted text blocks that indicate a presence of a bullet point in the document;
   assign a hierarchical category to each identified document section;
   insert text of each document section into a hierarchical data structure based upon the assigned hierarchical category; and
   traverse the hierarchical data structure using search request data to identify one or more document sections that have text relating to the search request data.

2. The system of claim 1, wherein converting the document from a first format to a second format comprises converting the document from a Portable Document Format (PDF) to a paginated Hypertext Markup Language (HTML) format.

3. The system of claim 2, wherein extracting the plurality of text blocks from the converted document comprises:
   extracting at least one or more attributes from the HTML-converted document;
   inserting the plurality of text blocks into a dataframe; and
   ordering the plurality of text blocks in the dataframe according to a page number, a top coordinate value and a left coordinate value.

4. The system of claim 1, wherein the computing device removes one or more of the plurality of extracted text blocks that do not correspond to a section of the document.

5. The system of claim 4, wherein removing one or more of the plurality of extracted text blocks that do not correspond to a section of the document comprises identifying at least one header block or at least one footer block in the plurality of extracted text blocks and removing the identified header and footer blocks.

6. The system of claim 5, wherein identifying at least one header block or at least one footer block in the plurality of extracted text blocks comprises:
   comparing one or more text strings in a predefined window at the top or the bottom of consecutive pages of the document to determine a match; and
   identifying the matching text strings as a header block or a footer block.

7. The system of claim 2, wherein identifying one or more document sections from the extracted text blocks using the document metadata by identifying strings in the extracted text blocks that indicate a presence of a bullet point in the document comprises:
   determining a starting boundary of a document section based upon a presence of a bullet point and corresponding text as HTML entities on a same line of the converted document;
   determining indentation values associated with a start of each extracted text block using the metadata;
   calculating a number of times that each unique indentation value occurs in the converted document;
   removing one or more indentation values that falsely indicate a start of an extracted text block;
   selecting one or more unique indentation values that occur at least a defined number of times in the extracted text blocks as corresponding to a start of a document section; and
   identifying one or more bullet point strings in the document section using the selected unique indentation values.

8. The system of claim 7, wherein the computing device flags each line in the extracted text blocks containing an identified bullet point string that corresponds to a start of a document section.

9. The system of claim 1, wherein assigning a hierarchical category to each identified document section comprises:
   determining a set of hierarchical categories for the converted document based upon unique indentation values of the document sections identified in the converted document, wherein a lowest indentation value corresponds to a highest hierarchical category; and
   assigning a hierarchical category from the set of hierarchical categories to each identified document section based upon the indentation value of the identified document section.

10. The system of claim 9, wherein assigning a hierarchical category from the set of hierarchical categories to each identified document section based upon the indentation value of the identified document section comprises assigning the identified document section to a hierarchical category when the indentation value for the identified document section falls within a range of indentation values associated with the hierarchical category.

11. The system of claim 1, wherein inserting text of each document section into a hierarchical data structure comprises identifying the text of each document section based upon one or more flagged lines in the extracted text blocks and inserting the text of the document section into the hierarchical data structure based upon the assigned hierarchical category for the section.

12. The system of claim 11, wherein inserting the text of the document section into the hierarchical data structure based upon the assigned hierarchical category for the section comprises backtracking through the hierarchical data structure to find an immediate parent for the document section.

13. The system of claim 1, wherein traversing the hierarchical data structure using search request data to identify one or more document sections that contain text relating to the search request data comprises:
   receiving the search request data from a remote computing device;
   locating one or more document sections in the hierarchical data structure that contain text matching one or more elements of the search request data; and retrieving the located document sections from the hierarchical data structure.

14. The system of claim 13, wherein at least the located document sections are transmitted to the remote computing device for display.

15. The system of claim 13, wherein the document comprises one or more sub-sections that have a relationship to a parent section and the hierarchical data structure is arranged based upon the relationship between the one or more sub-sections and the parent section.

16. The system of claim 13, wherein retrieving the located document sections from the hierarchical data structure comprises retrieving all sub-sections that are related to the located document sections in the hierarchical data structure.

17. The system of claim 13, wherein the computing device ranks the located document sections according to relevance to the search request data using one or more encoders.

18. A computerized method of automatically identifying text sections of a document to generate a searchable hierarchical data structure corresponding to the document, the method comprising:
receiving, by a computing device, a document comprising a plurality of text entities;
converting, by the computing device, the document from a first format to a second format, including generating metadata associated with one or more of text alignment in the document, text position in the document, text spacing in the document, and fonts in the document;
extracting, by the computing device, a plurality of text blocks from the converted document, including determining coordinates associated with each text entity using the document metadata;
identifying, by the computing device, one or more document sections from the extracted text blocks using the document metadata by identifying strings in the extracted text blocks that indicate a presence of a bullet point in the document;
assigning, by the computing device, a hierarchical category to each identified document section;
inserting, by the computing device, text of each document section into a hierarchical data structure based upon the assigned hierarchical category; and
traversing, by the computing device, the hierarchical data structure using search request data to identify one or more document sections that have text relating to the search request data.

19. The method of claim 18, wherein converting the document from a first format to a second format comprises converting the document from a Portable Document Format (PDF) to a paginated Hypertext Markup Language (HTML) format.

20. The method of claim 19, wherein extracting the plurality of text blocks from the converted document comprises:
extracting at least one or more attributes from the HTML-converted document;
inserting the plurality of text blocks into a dataframe; and
ordering the plurality of text blocks in the dataframe according to a page number, a top coordinate value and a left coordinate value.

21. The method of claim 18, wherein the computing device removes one or more of the plurality of extracted text blocks that do not correspond to a section of the document.

22. The method of claim 21, wherein removing one or more of the plurality of extracted text blocks that do not correspond to a section of the document comprises identifying at least one header block or at least one footer block in the plurality of extracted text blocks and removing the identified header and footer blocks.

23. The method of claim 22, wherein identifying at least one header block or at least one footer block in the plurality of extracted text blocks comprises:
comparing one or more text strings in a predefined window at the top or the bottom of consecutive pages of the document to determine a match; and
identifying the matching text strings as a header block or a footer block.

24. The method of claim 19, wherein identifying one or more document sections from the extracted text blocks using the document metadata by identifying strings in the extracted text blocks that indicate a presence of a bullet point in the document comprises:
determining a starting boundary of a document section based upon a presence of a bullet point and corresponding text as HTML entities on a same line of the converted document;
determining indentation values associated with a start of each extracted text block using the metadata;
calculating a number of times that each unique indentation value occurs in the converted document;
removing one or more indentation values that falsely indicate a start of an extracted text block;
selecting one or more unique indentation values that occur at least a defined number of times in the extracted text blocks as corresponding to a start of a document section; and
identifying one or more bullet point strings in the document section using the selected unique indentation values.

25. The method of claim 24, wherein the computing device flags each line in the extracted text blocks containing an identified bullet point string that corresponds to a start of a document section.

26. The method of claim 18, wherein assigning a hierarchical category to each identified document section comprises:
determining a set of hierarchical categories for the converted document based upon unique indentation values of the document sections identified in the converted document, wherein a lowest indentation value corresponds to a highest hierarchical category; and
assigning a hierarchical category from the set of hierarchical categories to each identified document section based upon the indentation value of the identified document section.

27. The method of claim 26, wherein assigning a hierarchical category from the set of hierarchical categories to each identified document section based upon the indentation value of the identified document section comprises assigning the identified document section to a hierarchical category when the indentation value for the identified document section falls within a range of indentation values associated with the hierarchical category.

28. The method of claim 18, wherein inserting text of each document section into a hierarchical data structure comprises identifying the text of each document section based upon one or more flagged lines in the extracted text blocks and inserting the text of the document section into the hierarchical data structure based upon the assigned hierarchical category for the section.

29. The method of claim 28, wherein inserting the text of the document section into the hierarchical data structure based upon the assigned hierarchical category for the section comprises backtracking through the hierarchical data structure to find an immediate parent for the document section.

30. The method of claim 18, wherein traversing the hierarchical data structure using search request data to identify one or more document sections that contain text relating to the search request data comprises:
   receiving the search request data from a remote computing device;
   locating one or more document sections in the hierarchical data structure that contain text matching one or more elements of the search request data; and
   retrieving the located document sections from the hierarchical data structure.

31. The method of claim 30, wherein at least the located document sections are transmitted to the remote computing device for display.

32. The method of claim 30, wherein the document comprises one or more sub-sections that have a relationship to a parent section and the hierarchical data structure is arranged based upon the relationship between the one or more sub-sections and the parent section.

33. The method of claim 30, wherein retrieving the located document sections from the hierarchical data structure comprises retrieving all sub-sections that are related to the located document sections in the hierarchical data structure.

34. The method of claim 30, wherein the computing device ranks the located document sections according to relevance to the search request data using one or more encoders.

* * * * *